(12) United States Patent
Shinjo

(10) Patent No.: US 7,686,651 B2
(45) Date of Patent: Mar. 30, 2010

(54) SENSOR APPARATUS

(75) Inventor: Izuru Shinjo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 872 days.

(21) Appl. No.: 11/469,634

(22) Filed: Sep. 1, 2006

(65) Prior Publication Data

US 2007/0247322 A1    Oct. 25, 2007

(30) Foreign Application Priority Data

Apr. 20, 2006    (JP) .............................. 2006-116878

(51) Int. Cl.
*G01L 7/00*    (2006.01)
(52) U.S. Cl. .................. 439/620.22; 73/756; 439/913
(58) Field of Classification Search .................. 439/736, 439/620.21, 621.22; 73/756, 514.18, 754
See application file for complete search history.

(56) References Cited

U.S. PATENT DOCUMENTS

| | | | |
|---|---|---|---|
| 6,601,453 B2 * | 8/2003 | Miyazaki et al. .............. | 73/754 |
| 6,615,669 B1 * | 9/2003 | Nishimura et al. ............ | 73/756 |
| 6,678,164 B2 * | 1/2004 | Chikuan et al. .............. | 361/752 |
| 6,962,081 B2 * | 11/2005 | Ueyanagi et al. ......... | 73/514.18 |
| 7,036,385 B2 * | 5/2006 | Murai ......................... | 73/756 |
| 7,347,737 B2 * | 3/2008 | Horiba ....................... | 439/676 |
| 2002/0144554 A1 | 10/2002 | Ueyanagi et al. | |

FOREIGN PATENT DOCUMENTS

| | | |
|---|---|---|
| DE | 195 20 629 A1 | 12/1995 |
| EP | 1 312 907 A1 | 5/2003 |
| FR | 2 707 002 A1 | 12/1994 |
| JP | 06-186104 A | 8/1994 |
| JP | 2000-337987 A | 8/2000 |
| JP | 2002-217422 A | 8/2002 |
| JP | 2003-315189 A | 11/2003 |
| KR | 2003-0039985 A | 5/2003 |

\* cited by examiner

*Primary Examiner*—Neil Abrams
(74) *Attorney, Agent, or Firm*—Sughrue Mion, PLLC

(57) ABSTRACT

The sensor module has four internal terminals that include a first ground terminal, a second ground terminal, an output signal terminal, and a power terminal, three external terminals are connected to the first ground terminal, the output signal terminal, and the power terminal, respectively, a sensor main body portion is obtained by molding the sensor module to which the external terminals are connected integrally in a insulating resin, and a connector connecting portion and a mount portion are molded integrally with the sensor module in this sensor main body portion. With this system, different orders of arrangement of the three external terminals may be formed while insuring that capacitors may be mounted between certain terminals without spanning other wiring patterns.

7 Claims, 3 Drawing Sheets

SENSOR APPARATUS

BACKGROUND OF THE INVENTION

1. Field of the Invention

The present invention relates to a sensor apparatus in which a sensor module and a connector connecting portion are integrated.

2. Description of the Related Art

Conventional pressure sensor apparatuses have: a lower case that has a pressure medium introducing aperture; a sensor module; and an upper case into which external terminals are insert molded (see Patent Literature 1, for example).

The sensor module includes: a module base; a sensor element that is installed in a recess portion that is formed on a lower surface of the module base; and internal terminals that are connected to the sensor element by lead wires. The sensor module is adhesively fixed to the upper case, and the internal terminals thereof and the external terminals of the upper case are joined together by welding. In addition, the lower case is fixed to the upper case and the sensor module adhesively such that the pressure medium can be introduced to the sensor element trough the pressure medium introducing aperture. Here, three internal terminals constituted by a power terminal, a ground terminal, and an output signal terminal are disposed on the sensor module.

Patent Literature 1: Japanese Patent Laid-Open No. 2000-337987 (Gazette)

In conventional pressure sensor apparatuses, one problem has been that a process is required for adhesively fixing the sensor module to the upper case, increasing manufacturing costs.

Furthermore, the order of arrangement of functions of the external terminals in the connector connecting portion is determined by the order of arrangement of the three internal terminals, i.e., the power terminal, the ground terminal, and the output signal terminal in the sensor module. Thus, if the order of arrangement of the functions of the external terminals is to be modified, it is necessary to prepare a sensor module in which the order of arrangement of the internal terminals conforms to the desired order of arrangement of the functions of the external terminals, which has been problematic from the viewpoint of shared use and standardization of parts.

SUMMARY OF THE INVENTION

The present invention aims to solve the above problems and an object of the present invention is to provide a sensor apparatus that enables cost reductions by eliminating a process of adhesively fixing a sensor module, and also enables order of arrangement of functions of external terminals to be modified without having to prepare a plurality of types of sensor module.

A sensor apparatus according to the present invention includes: a sensor module that has a sensor element and a plurality of internal terminals; and a connector connecting portion that has a plurality of external terminals. The sensor module and the connector connecting portion are molded integrally using an insulating resin. In addition, the external terminals are fewer in number than the internal terminals, and each of the external terminals is connected to an internal terminal that is selected from the internal terminals.

According to the present invention, because the sensor module is molded integrally with the connector connecting portion using an insulating resin, a process for adhesively fixing the sensor module is no longer necessary, enabling costs to be reduced.

The order of arrangement of the functions of the plurality of external terminals can be modified by changing the internal terminals that are connected to the external terminals. Thus, the order of arrangement of the functions of the plurality of external terminals can be modified without having to prepare a sensor module in which the order of arrangement of the internal terminals conforms to the desired order of arrangement of the functions of the external terminals, enabling shared use and standardization of parts.

DETAILED DESCRIPTION OF THE PREFERRED EMBODIMENTS

Figure 1:
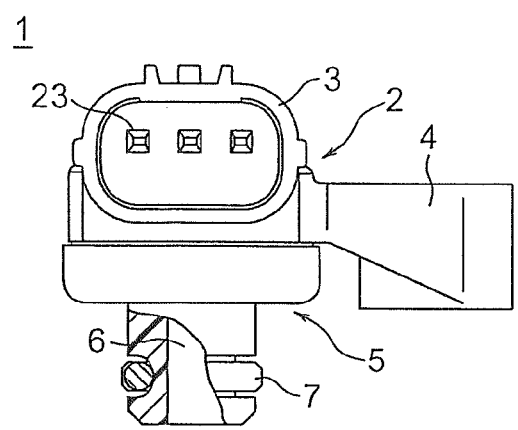
FIG. 1 is a side elevation of a sensor apparatus according to the present invention.

FIG. 1 is a side elevation of a sensor apparatus according to the present invention.

In FIG. 1, a sensor apparatus 1 includes: a sensor main body portion 2 in which a sensor module (not shown), a connector connecting portion 3, and a mount portion 4 are molded integrally in an insulating resin; a cover 5 that is fixed to the sensor main body portion 2 so as to cover the sensor module, and in which a pressure medium introducing aperture 6 is formed that introduces a pressure medium to a sensor element (not shown) that is mounted to the sensor module; and an O ring 7 that is mounted so as to be fitted over the cover 5.

Next, a method for manufacturing the sensor apparatus 1 will be explained with reference to FIGS. 2 through 9.

Figure 2:
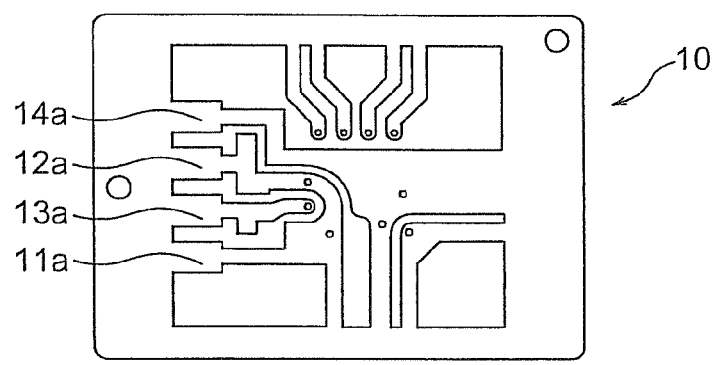
FIG. 2 is a bottom plan that shows a state of pattern formation of a lead frame in a method for manufacturing the sensor apparatus according to the present invention.

First, the lead frame 10 is passed through an etching process or pressing process such that desired electrical wiring patterns are formed on the lead frame 10, as shown in FIG. 2. Here, an iron or copper sheet material to which a suitable plating treatment has been applied, for example, can be used for the lead frame 10. The electrical wiring patterns are linked around an outer periphery of the lead frame 10 to prevent them from separating from each other, and include a first ground terminal pattern portion 11a, a second ground terminal pattern portion 12a, an output signal terminal pattern portion 13a, a power terminal pattern portion 14a, etc.

Figure 3:
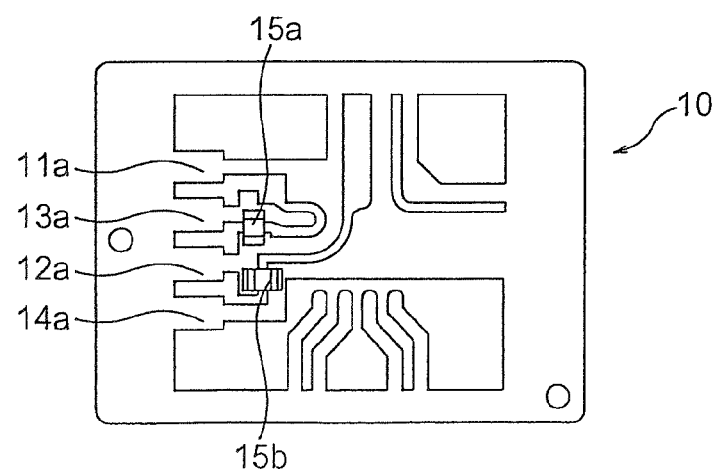
FIG. 3 is a top plan that shows a state in which capacitors are mounted to the lead frame in the method for manufacturing the sensor apparatus according to the present invention.

Next, two connecting terminals of a first capacitor 15a are joined to the second ground terminal pattern portion 12a and the output signal terminal pattern portion 13a using a solder or an electrically-conductive resin, and two connecting terminals of a second capacitor 15b are joined to the second ground terminal pattern portion 12a and the power terminal pattern portion 14a using a solder or an electrically-conductive resin. Thus, the first and second capacitors 15a and 15b, as shown in FIG. 3, are mounted to an upper surface side of the lead frame 10 so as to be inserted between the second ground terminal pattern portion 12a and the output signal terminal pattern portion 13a and inserted between the second ground terminal pattern portion 12a and the power terminal pattern portion 14a, respectively. Here, because the second ground terminal pattern portion 12a is positioned between the output signal terminal pattern portion 13a and the power terminal pattern portion 14a, no other electrical wiring patterns are present between the connecting terminals of the first and second capacitors 15a and 15b. In other words, the first and second capacitors 15a and 15b are mounted without spanning other electrical wiring patterns.

Next, the lead frame 10 to which the first and second capacitors 15a and 15b have been mounted is molded in an insulating resin, such as an epoxy resin, for example. A molded resin portion 16 is molded integrally on the lead frame 10 so as to embed predetermined regions on upper and lower surfaces of the lead frame 10. The first and second capacitors 15a and 15b are embedded in the molded resin portion 16. End portion regions of the first ground terminal pattern portion 11a, the second ground terminal pattern portion 12a, the output signal terminal pattern portion 13a, and the power terminal pattern portion 14a project out of the molded resin portion 16, and a component mounting surface on a lower surface of the lead frame 10 is exposed through the molded resin portion 16.

Figure 4:
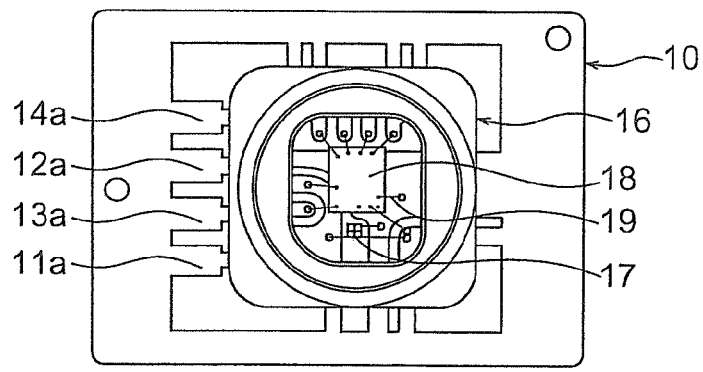
FIG. 4 is a bottom plan that shows a state in which the lead frame is molded in resin in the method for manufacturing the sensor apparatus according to the present invention.

Next, as shown in FIG. 4, a sensor element 17 that is constituted by a semiconductor that detects pressure and a signal processing portion 18 are mounted to the component mounting surface that is exposed through the molded resin portion 16 using a solder or an adhesive, and the sensor element 17 and signal processing portion 18 are connected to the electrical wiring patterns of the lead frame 10 by gold wires 19.

Figure 5:
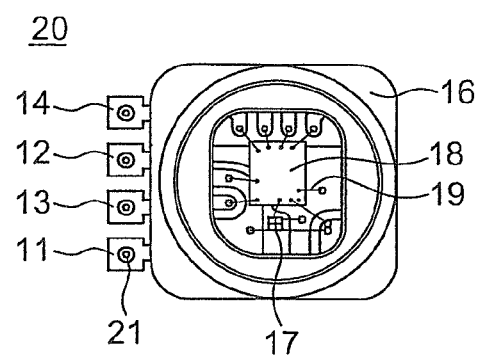
FIG. 5 is a bottom plan of a sensor module in the method for manufacturing the sensor apparatus according to the present invention.

Next, as shown in FIG. 5, unwanted portions of the lead frame 10 are cut and removed to obtain a sensor module 20 that includes a first ground terminal 11, a second ground terminal 12, an output signal terminal 13, and a power terminal 14 that constitute four internal terminals. In addition, projections (lugs) 21 are formed on projecting portions of the first ground terminal 11, the second ground terminal 12, the output signal terminal 13, and the power terminal 14.

Figure 6:
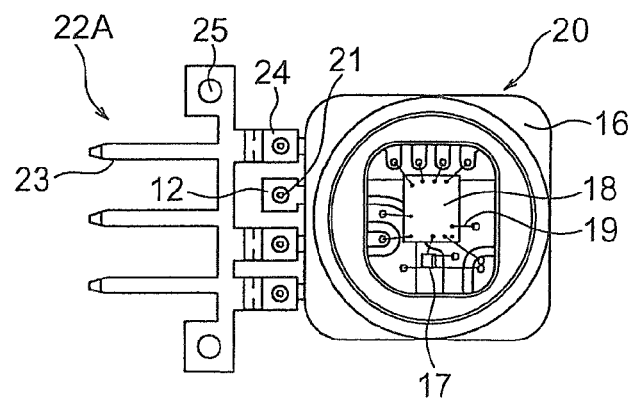
FIG. 6 is a bottom plan that shows a state in which external terminals are connected to the sensor module in the method for manufacturing the sensor apparatus according to the present invention.

Next, an external terminal frame 22A is prepared in which three external terminals 23 that are arranged at a predetermined pitch and three joint portions 24 that correspond to the projecting portions of the first ground terminal 11, the output signal terminal 13, and the power terminal 14 are linked to each other. Then, as shown in FIG. 6, the external terminal frame 22A is positioned relative to the sensor module 20 using positioning apertures 25 that are formed on unwanted portions of the external terminal frame 22A, and the respective joint portions 24 are joined to the projecting portions of the first ground terminal 11, the output signal terminal 13, and the power terminal 14 by projection welding.

Figure 7:
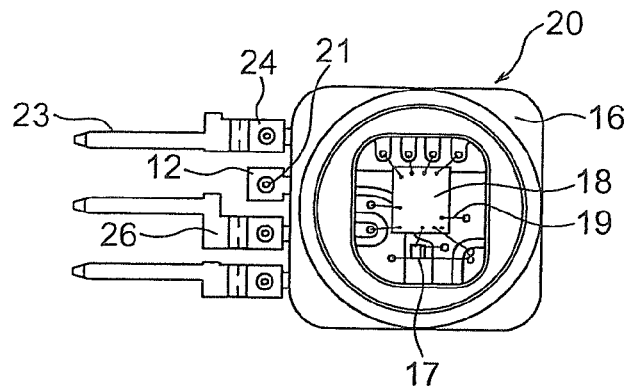
FIG. 7 is a bottom plan of a sensor module in which tie bars have been cut in the method for manufacturing the sensor apparatus according to the present invention.

Next, as shown in FIG. 7, unwanted portions of the external terminal frame 22A are cut and removed such that each of the external terminals 23 is linked to a corresponding joint portion 24 by means of a bent portion 26. Here, misalignments between the external terminals 23 and the joint portions 24 in the direction of arrangement of the external terminals 23 are absorbed by the bent portions 26.

Figure 8:
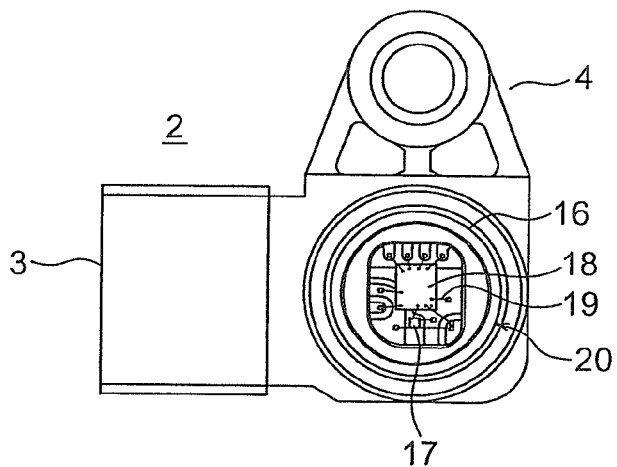
FIG. 8 is a bottom plan of a sensor main body portion in the method for manufacturing the sensor apparatus according to the present invention.

Next, the sensor module 20 and the external terminals 23 are molded integrally in an insulating resin, such as a polybutylene terephthalate (PBT) resin, for example, to obtain the sensor main body portion 2 that is shown in FIG. 8. Here, the connector connecting portion 3 in which the external terminals 23 are insert molded and the mount portion 4 are prepared integrally. A lower surface side of the sensor module 20 is exposed through the sensor main body portion 2.

Next, the cover 5 is fixed to the sensor main body portion 2 using an adhesive, heat crimping, or ultrasonic bonding, etc., so as to cover the exposed portions of the sensor module 20, and the O ring 7 is mounted to the cover 5 to obtain the sensor apparatus 1 that is shown in FIG. 1. In this sensor apparatus 1, the three external terminals 23 of the connector connecting portion 3 are arranged in a row in a functional order of a ground terminal, an output signal terminal, and a power terminal from the left in FIG. 1.

A method for changing the order of arrangement of the functions of the external terminals 23 of the connector connecting portion 3 of the sensor apparatus 1 will now be explained.

Figure 9:
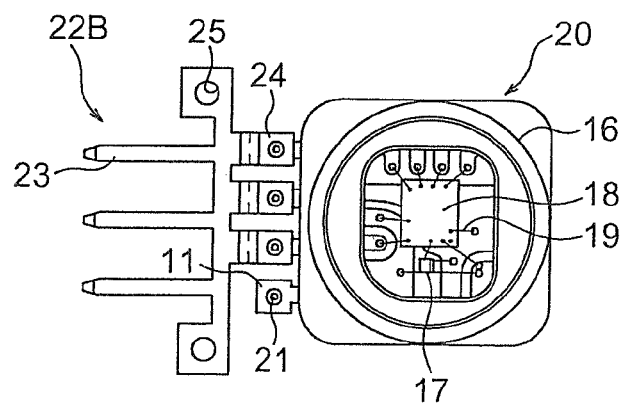
FIG. 9 is a bottom plan that shows another example of a state in which external terminals are connected to the sensor module in the method for manufacturing the sensor apparatus according to the present invention.

First, an external terminal frame 22B that is shown in FIG. 9 is prepared instead of the external terminal frame 22A. This external terminal frame 22B is formed such that three external terminals 23 that are arranged at a predetermined pitch and three joint portions 24 that correspond to the projecting portions of the second ground terminal 12, the output signal terminal 13, and the power terminal 14 are linked to each other. Then, as shown in FIG. 9, the respective joint portions 24 are joined to the projecting portions of the second ground terminal 12, the output signal terminal 13, and the power terminal 14 of the sensor module 20 by projection welding using positioning apertures 25 of the external terminal frame 22B as a reference. Next, unwanted portions of the external terminal frame 22B are cut and removed, and the sensor module 20 and the external terminals 23 are molded integrally in an insulating resin to obtain a sensor main body portion. Then, the cover 5 is fixed to the sensor main body portion, and the O ring 7 is mounted to the cover 5 to obtain a sensor apparatus.

In a sensor apparatus produced in this manner, the external terminals 23 are arranged in a functional order of an output signal terminal, a ground terminal, and a power terminal from the left in FIG. 1. Because the first ground terminal 11 and the second ground terminal 12 are constituted by a single electrical wiring pattern that is linked inside the sensor module 20, an external terminal 23 is functionally identical whether joined to the first ground terminal 11 or joined to the second ground terminal 12.

Thus, in a sensor apparatus according to the present invention, because the connector connecting portion and the mount portions that correspond to the upper cover in conventional devices and the sensor module are molded integrally in an insulating resin, processes for adhesively fixing the sensor module and the upper cover that were required in conventional devices are no longer necessary. The connector connecting portion 3 and the mount portion 4 are prepared simultaneously in the molding process. Thus, manufacturing processes for the sensor apparatus are simplified, enabling costs to be reduced.

One power terminal, one output signal terminal, and two ground terminals are projected from the sensor module, two external terminals are connected to the power terminal and the output signal terminal, and one external terminal is connected to a ground terminal that is selected from the two ground terminals. Thus, modifying the order of arrangement of the functions of the three external terminals is facilitated, enabling a sensor apparatus that has a high degree of design freedom to be obtained.

Because the sensor apparatus has capacitors built in, noise tolerance is improved. In addition, because the capacitors are inserted between the power terminal and the ground terminal and between the output signal terminal and the ground terminal, noise is released to the low-impedance ground terminal, further improving noise tolerance. Because the ground terminal is positioned between the power terminal and the output signal terminal, the capacitors can be mounted without spanning other electrical wiring patterns, improving workability when connecting the capacitors, and facilitating manufacturing.

Moreover, in the above explanation, two ground terminals are disposed, but two power terminals or two output signal terminals may also be disposed. In that case, if the ground terminal is positioned between the power terminal and the output signal terminal, effects can also be achieved that enable workability to be improved when connecting the capacitors.

Because the projections are formed on the internal terminals, welding strength can be improved. Specifically, if the thickness of the base material is increased, formation of appropriate projections becomes difficult, and irregularities in lug height also increase. The external terminals are set to various thicknesses depending on required specifications. On the other hand, since the internal terminals are not exposed outside the sensor apparatus, they can be set to any thickness. Thus, by forming the projections on the internal terminals instead of on the external terminals, formation of appropriate projections becomes possible, ensuring stable joining strength.

Because an external terminal frame is used in which the three external terminals and the three joint portions are linked and positioning apertures are formed on unwanted portions, the internal terminals that correspond to each of the joint portions can be positioned in a stable state, improving workability during welding.

Bent portions are interposed between the external terminals and the joint portions. These bent portions absorb misalignments among the external terminals and the joint portions, i.e., the internal terminals, in the direction of arrangement of the external terminals. Thus, the array pitch of the internal terminals can be set to a minimum pitch that enables welding, enabling reductions in the size of the sensor apparatus. The array pitch of the external terminals can also be modified to match required specifications without changing the array pitch of the internal terminals.

Now, in the above explanation, a total of four internal terminals are arranged such that two internal terminals that have identical functions are positioned among other internal terminals, one external terminal is connected to an internal terminal that is selected from the internal terminals that have identical functions, two external terminals are connected to the two remaining internal terminals, and it is possible modify the order of arrangement of the functions in three external terminals. However, the number of internal terminals that have identical functions is not limited to two, and may be three or more. In that case, the order of arrangement of the functions in the external terminals can be modified by positioning the internal terminals that have differing functions between the internal terminals that have identical functions and connecting an external terminal to one internal terminal that is selected from the internal terminals that have identical functions.

It is not necessary to have internal terminals that have identical functions; all of the internal terminals may also have differing functions. In that case, the order of arrangement of the functions in the external terminals can be modified by making the number of external terminals less than the number of internal terminals and changing the selection of the internal terminals that are connected to the external terminals. In addition, the number of internal terminals is not limited to four.

In the above explanation, capacitors are mounted in order to improve noise tolerance, but nonlinear resistance elements (variable resistors) can also be mounted instead of the capacitors.

In the above explanation, the external terminals are joined to the internal terminals by projection welding, but the joining of the two is not limited to projection welding, and may also be other welding, or it may also be soldering, crimping, plugging, etc.

In the above explanation, a pressure sensor apparatus has been explained, but the present invention is not limited to pressure sensor apparatuses, and may also be applied, for example, to gas sensor apparatuses, or acceleration sensor apparatuses, etc.

In the above explanation, a sensor main body portion is prepared by integrally molding the sensor module, the connector connecting portion, and the mount portion using a PBT resin, but the molding resin is not limited to a PBT resin provided that the resin has a lower melting point than the epoxy resin of the molded resin portion of the sensor module. In this manner, the molded resin portion of the sensor module is prevented from softening or melting, etc., during the process of molding the sensor main body portion.

What is claimed is:

1. A sensor apparatus comprising:
    a sensor module that has a sensor element and a plurality of internal terminals; and
    a connector connecting portion that has a plurality of external terminals, wherein:
    said sensor module and said connector connecting portion are molded integrally using an insulating resin;
    at least two internal terminals among said plurality of internal terminals have identical functions;
    an internal terminal that has a different function is positioned between said internal terminals that have identical functions;
    said external terminals are fewer in number than said internal terminals;
    each of said external terminals is connected to an internal terminal that is selected from said internal terminals; and
    one internal terminal that is selected from among said internal terminals that have identical functions is connected to said external terminal.

2. A sensor apparatus according to claim 1, wherein:
    said plurality of internal terminals are constituted by at least a power terminal, an output signal terminal, and ground terminals;
    said internal terminals that have identical functions are said ground terminals; and at least one of said ground terminals is disposed between said power terminal and said output signal terminal.

3. A sensor apparatus according to claim 2, further comprising capacitors which are respectively inserted between said ground terminal that is disposed between said power terminal and said output signal terminal and said power terminal; and between said ground terminal that is disposed between said power terminal and said output signal terminal and said output signal terminal.

4. A sensor apparatus according to claim 1, wherein:
said external terminals are joined to said internal terminals by projection welding; and
projections are disposed on said internal terminals.

5. A sensor apparatus according to claim 1, wherein said external terminals are connected to said internal terminals by means of bent portions.

6. A sensor apparatus according to claim 1, wherein said sensor element is a sensor element that detects pressure.

7. A sensor apparatus according to claim 1, wherein said external terminals are directly linked together and form part of an external terminal frame, said external terminal frame also including position apertures to position said external terminal frame relative to said sensor module to join said external terminals to said internal terminals.

* * * * *